United States Patent [19]

Rudolph et al.

[11] Patent Number: 5,525,396
[45] Date of Patent: Jun. 11, 1996

[54] LID FOR A PARTICLE COLLECTOR

[75] Inventors: Robert Rudolph, Rockford, Ill.; Jerry Hogan, West Bend, Wis.

[73] Assignee: Collectif Partnership, Rockford, Ill.

[21] Appl. No.: 380,040

[22] Filed: Jan. 30, 1995

[51] Int. Cl.$^6$ .................................................. B01D 45/16
[52] U.S. Cl. .......................... 428/131; 428/192; 428/156; 55/342; 55/349; 55/356; 55/359; 55/449; 55/451; 55/459.1; 55/460; 55/DIG. 3
[58] Field of Search .................................... 428/131, 192, 428/156; 55/342, 349, 356, 359, 449, 451, 459.1, 460, DIG. 3

[56] References Cited

U.S. PATENT DOCUMENTS

| | | | |
|---|---|---|---|
| 2,384,699 | 9/1945 | Russell et al. | 55/449 |
| 2,905,266 | 9/1959 | Poch | 55/449 |
| 3,233,882 | 2/1966 | Calaceto | 55/451 |
| 4,019,883 | 4/1977 | Klomp | 55/460 |
| 5,047,089 | 9/1991 | Grant | 134/21 |
| 5,269,637 | 12/1993 | Gomes, Jr. | 55/459.1 |

OTHER PUBLICATIONS

P. 57, 1987 issue of *Wood Magazine*.
Article, publisher unknown, entitled *How can I convert my Dust Collection System to a "Two Stage System?"* and bearing the date stamp Michael C. Payden — Feb. 23, 1994.

*Primary Examiner*—William P. Watkins, III
*Attorney, Agent, or Firm*—Leydig, Voit & Mayer, Ltd.

[57] ABSTRACT

A molded plastic lid adapted to generally close off the upper open end of a container and adapted to enable separation of entrained particles from a stream of air for collection of the particles in the container. The lid is formed with circumferentially extending inlet and outlet chambers opening downwardly into the container and having inlet and outlet openings, respectively, for receiving and discharging the air stream. The inlet chamber is formed with an upper surface which slopes downwardly upon progressing from the inlet opening to cause the air entering the container to flow in a curved and downwardly inclined direction so as to establish a cyclonic action in the container for separation of the particles. The outlet chamber is formed with an upper surface which slopes upwardly upon progressing toward the outlet opening to cause the air exiting the container to flow in the same generally curved direction but at an upwardly inclined angle.

5 Claims, 3 Drawing Sheets

LID FOR A PARTICLE COLLECTOR

BACKGROUND OF THE INVENTION

This invention relates generally to a particle collector adapted to remove and collect particles entrained in an air stream.

More particularly, the invention relates to a collector of the type having a relatively large container for the collection of particles, having a lid formed with inlet and outlet openings adapted to allow the air stream to flow into and out of the container, and relying on a reduction in the velocity of the air stream as the air stream enters the collector and on turbulence of the air in the container to cause the particles to separate from the air without the need of a filter element. Collectors of this type are particularly suitable for use as the first stage of a two-stage collection system where the second-stage collector is adapted to remove relatively fine particles and dust from the air stream and where the volume of relatively large particles entrained in the air is substantially greater than the volume of the entrained dust and fine particles. For example, a two-stage collection system of this type is particularly useful in collecting the dust and wood chips generated by power tools such as planers, saws, and the like.

In a typical two-stage dust and wood chip collection system, a shroud is located near the power tool and is adapted to trap the dust and wood chips in a confined area. A flexible hose or so-called pickup hose connects the shroud with the inlet of the first-stage collector. A second hose or so-called suction hose connects the outlet of the first-stage collector with the inlet of the second-stage collector. An electric blower draws air from the inlet of the second-stage collector so as to create a vacuum upstream of the second-stage collector. The electric blower is typically part of the second-stage collector. For example, the second-stage collector may be a common household-type shop vacuum. Alternately, the second-stage collector may be an industrial-type single-stage or two-stage collector.

With the foregoing arrangement, the vacuum draws the dust and wood chips away from the shroud and into the top of first-stage collector by way of the pickup hose. As the air flows through the first-stage collector, the relatively large particles fall from the air stream and collect in the container. The dust and smaller particles pass through the first-stage collector and are carried to the second-stage collector by way of the suction hose. The air stream exits the second-stage collector through a filter element which traps the dust and the relatively small particles.

A principle advantage in the use of a two-stage collection system of this type is the ability to reduce the downtime of the system due to the need to dispose of the collected waste. While the second-stage collector is capable of collecting all of the dust and the wood chips generated by the power tool, the second-stage collector typically includes fasteners which must be disengaged in order to empty the collector. The first-stage collector, on the other hand, is capable of collecting the bulk of the waste and is capable of being disassembled and reassembled relatively quickly and easily. The lid of the first-stage collector is typically adapted to rest on top of the container. Advantageously, the vacuum created by the blower holds the lid in place when the collection system is operating. This arrangement permits the lid to be simply raised off of the container to enable emptying of a full container or replacement of a full container with an empty container after the blower has been turned off.

Prior lids adapted for use in first-stage collectors are typically formed with generally vertically facing inlet and outlet openings. As a result, the air stream flows into the container in a generally downward direction and the air is drawn out of the container in a generally upward direction. With the outlet opening being in relatively close proximity to larger particles which may be circulating in the container, the outgoing air tends to draw these larger particles out of the container.

Moreover, if the level of particles collected in the container is relatively high, the downwardly directed incoming air stream resulting from these prior lids tends to impinge directly onto the collected particles and tends to cause some of these particles to be lifted into the turbulent air in the container. As a result, as the level of the particles collected in the container rises, the tendency for the larger particles to be lifted and carried out of the container by the outgoing air increases.

Further, in some types of second-stage collectors, the particles must pass through the impeller of the blower before they are removed from the air stream or trapped by the filter element. In this instance, the noise level of the blower increases and the likelihood of damage to the blower from relatively large particles increases as the efficiency of the first-stage collector decreases.

SUMMARY OF THE INVENTION

The general aim of the present invention is to provide a new and improved lid for a particle collector adapted to remove relatively large particles from a stream of air, the lid being capable of enhancing the efficiency of the collector when compared to the lids of prior collectors of the same general type.

A detailed objective is to achieve the foregoing by providing a molded plastic lid having an inlet chamber adapted to cause the incoming air to flow in a generally curved and downwardly inclined direction into the container so as to establish a cyclonic action in the container and thereby enhance removal of the particles from the air in the container.

Another detailed objective of the invention is to provide an inlet chamber adapted to reduce the velocity of the air as the air enters the inlet chamber so that some of the larger particles start to separate from the air stream before reaching the container and to provide a wall near the downstream end of the inlet chamber to direct the separated particles downwardly into the container.

Still another detailed objective is to provide an outlet chamber adapted to cause the outgoing air to flow in a curved and upwardly inclined direction so as to reduce the likelihood of particles being drawn from the container by the air exiting the container.

These and other objects and advantages of the invention will become more apparent from the following detailed description when taken in conjunction with the accompanying drawings.

Figure 1:
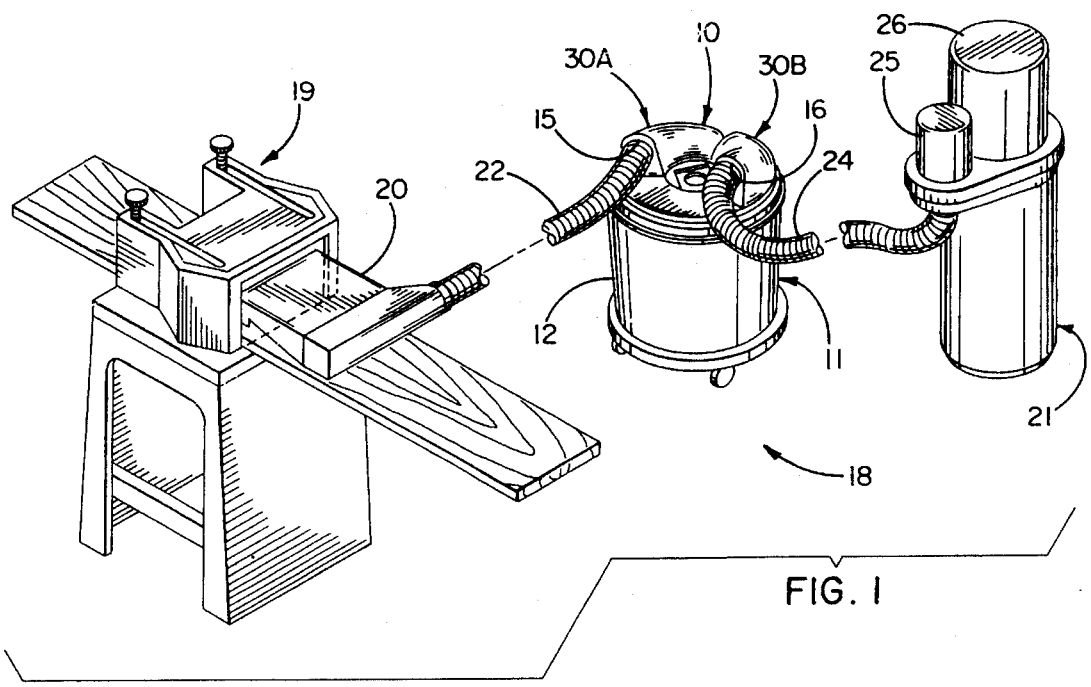
FIG. 1 is a perspective view of typical particle collection system adapted to collect dust and wood chips from a planer and including a collector having a container equipped with a new and improved lid incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

Figure 7:
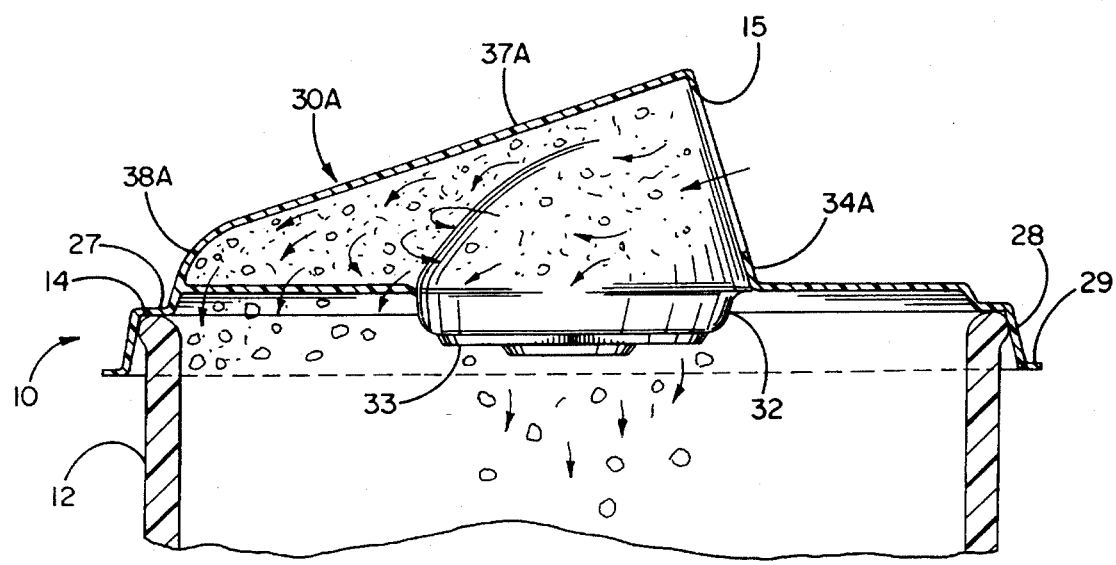
FIG. 7 is a cross-sectional view taken substantially along the line 7—7 of FIG. 3.

For purposes of illustration, the present invention is shown in the drawings as embodied in a molded plastic lid 10 (FIG. 1) of a separator and collector 11 adapted to remove and collect relatively large particles entrained in an air stream. The collector 11 includes a generally cylindrical container 12 having an open upper end portion 14 (FIG. 7). The lid 10 of the collector is generally circular and generally closes off the open end of the container. The lid is formed with an inlet opening 15 and an outlet opening 16 such that the air stream may flow into and out of the collector. In general, and as further described below, the velocity of the air is reduced and turbulence is created in the collector as the air enters the collector so as to enable separation of the relatively large particles from the air without the need for a filter element. The collector is especially suitable for use as the first stage of a two-stage collection system 18 of the type adapted to collect dust and wood chips from a power tool such as a planer 19.

The dust and chip collection system 18 includes the collector 11, a shroud 20 which is upstream of the collector 11, and a second-stage collector 21 which is downstream of the collector 11. The shroud is configured and located adjacent the planer 19 so as to generally trap the dust and chips produced by the cutting tool of the planer. A pickup hose 22 connects the shroud with the inlet of the collector 11. A suction hose 24 connects the outlet of the collector 11 with an inlet of the second-stage collector 21. The second-stage collector 21 includes an electric blower 25 which is adapted to create a vacuum at the inlet of the second-stage collector so as to establish air flow through the collection system. A filter element 26 is located at the exit of the second-stage collector to enable removal of dust, as well as fine particles, from the air as it exits the second-stage collector.

With the foregoing arrangement, the vacuum draws the dust and wood chips from the shroud 20 and into the collector 11 by way of the pickup hose 22. As the air flows through the collector 11, relatively large particles separate from the air stream and are collected in the container 12. The dust and relatively fine particles pass through the collector 11 and are carried into the second-stage collector 21 by way of the suction hose 24. The dust and fine particles are then trapped and collected in the second-stage collector 21 as the air exits through the filter element 26.

The lid 10 is preferably sized and configured to slip over and to simply rest on the upper end portion 14 of the container 12. To this end, the lid is formed with a horizontal ring portion 27 (FIG. 7) adapted to rest onto the upper end portion of the container and an annular skirt 28 extending downwardly from the ring portion and sized to releasably telescope with the upper end portion of the container. The skirt is preferably located outwardly of the container and is formed with a horizontal flange 29 extending radially outwardly from the skirt. With this arrangement, the lid may be grabbed and raised easily from the container so as to enable a full container to be quickly emptied or replaced with an empty container.

Figure 2:
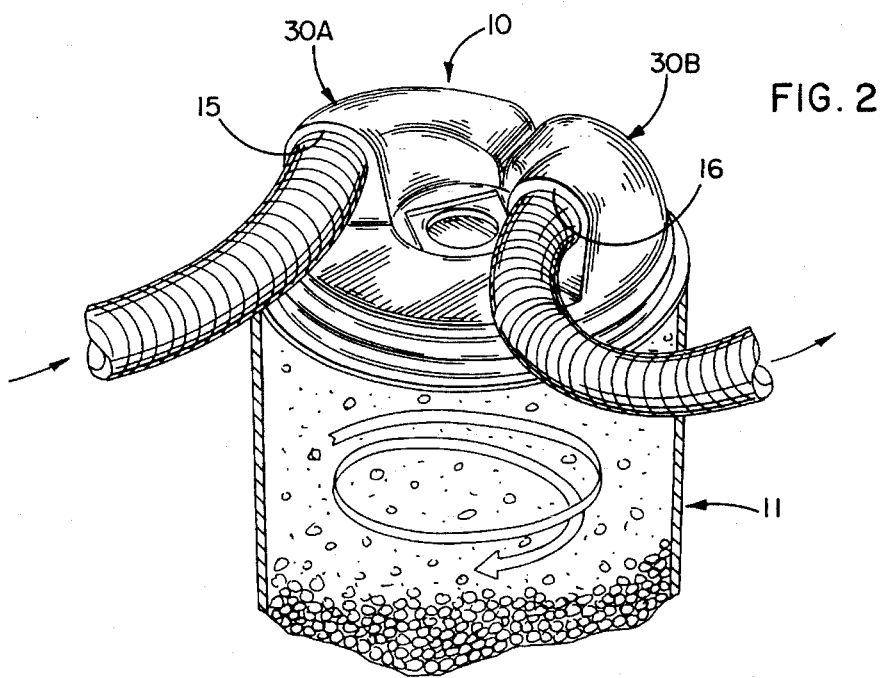
FIG. 2 is an enlarged fragmentary perspective view of the collector with the container shown in cross-section.

In accordance with the present invention, the lid 10 is formed with inlet and outlet chambers 30A and 30B, respectively, which are adapted to receive and to guide the incoming and outgoing air so as to establish a cyclonic action in the container 12 (See FIG. 2). Moreover, the inlet chamber 30A is adapted to cause a relatively abrupt reduction in the velocity of the incoming air before the air enters the container. As a result, the lid enables enhanced removal and collection of entrained particles from the air stream.

More specifically, the inlet chamber 30A is formed with the inlet opening 15 and is shaped to cause the incoming air stream to follow a flow path which curves generally circumferentially and which slopes downwardly upon progressing from the inlet opening so as to establish the cyclonic action in the container 12. In addition, the outlet chamber 30B is formed with the outlet opening 16 and is shaped to cause the outgoing air to follow a flow path which curves generally circumferentially and which slopes upwardly upon progressing toward the outlet opening so as to generally promote the cyclonic action in the container and to reduce the likelihood of particles being drawn into the outgoing air. To this end, the inlet and outlet chambers are enclosed within integrally molded wall portions which, as further described below, project generally upwardly from the ring portion 27 such that the chambers are generally located above the container.

The inlet and outlet openings 15, 16 face in an inclined but substantially horizontal direction. The inlet and outlet openings are located generally oppositely from one another on the lid 10 and generally face in the same direction. For purposes of explaining the invention, the inlet and outlet openings will be deemed to be located at the front or forward portions of the inlet and outlet chambers 30A, 30B. The inlet and outlet chambers extend generally circumferentially and rearwardly from the inlet and outlet openings and adjacent the ring portion so as to approach one another. The inlet and outlet chambers are further formed so as to open downwardly into the container. As a result, the air entering the container flows through the inlet opening and generally downwardly into the container, and the air exiting the container flows generally upwardly through the outlet chamber toward the outlet opening.

Figure 3:
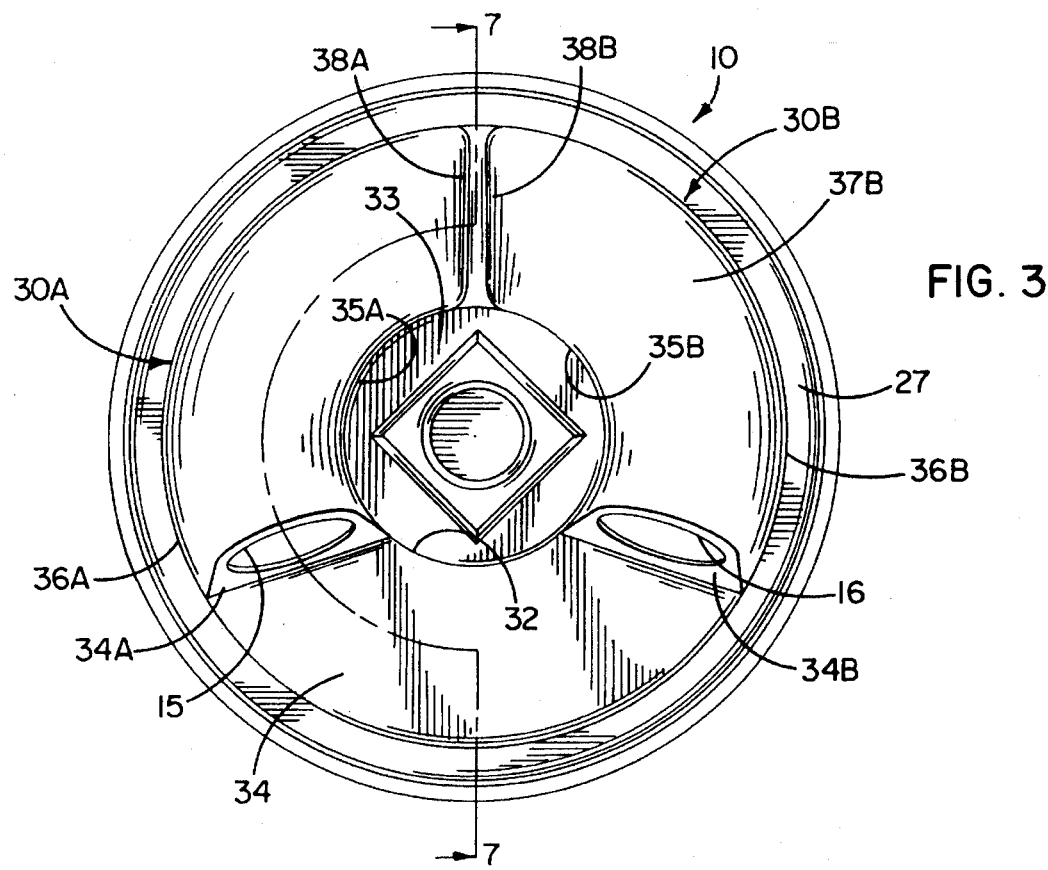
FIGS. 3, 4, 5, and 6 are a top, front, side, and bottom views, respectively, of the lid.
Figure 4:
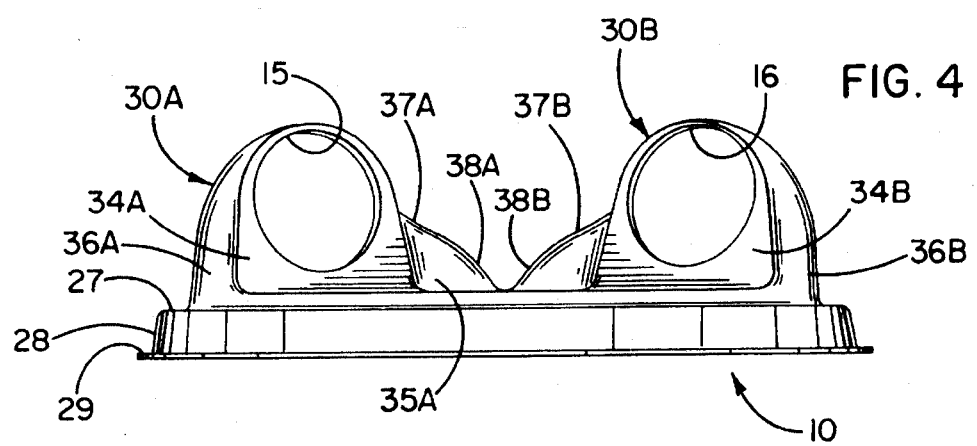
Figure 5:
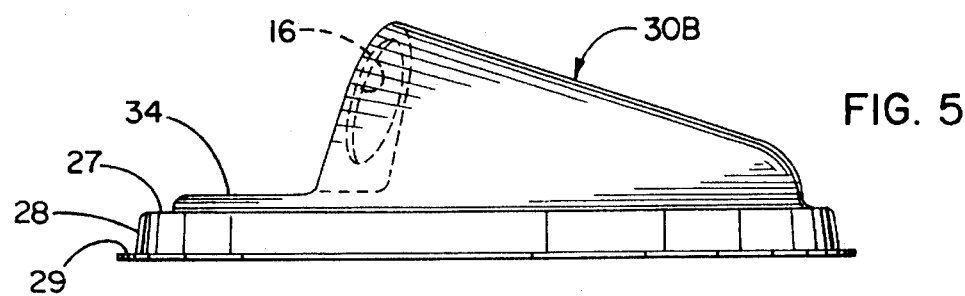

A centrally located cylindrical wall portion 32 extends downwardly between the inlet and outlet chambers 30A, 30B and generally separates the forward portions of the chambers radially from one another. A generally horizontal wall portion 33 (FIG. 3) is located in the cylindrical wall portion and is formed with a circular periphery which is molded to blend with the cylindrical wall portion to close the center portion of the lid 10. An additional horizontal wall portion 34 extends circumferentially between the chambers so as to close the forward portion of the lid and to circumferentially separate the forward portions of the chambers. The wall 34 is located just above the plane of the ring 27. The lid is preferably molded from an abrasion and impact resistant polymer such as acrylonitrile butadiene styrene resin to withstand the long-term exposure to impact and abrasion from the particles entrained in the air stream.

Except for the difference in the curvature of the chambers 30A and 30B relative to the openings 15 and 16, respectively, this difference resulting from the opposite placement of the chambers on the lid 10, the chambers are preferably formed so as to be substantially identical. Therefore, except where it is necessary for an operational understanding of the invention, only the inlet chamber 30A need be described in detail. In addition, it will become apparent that either chamber may serve as the inlet chamber, with the other chamber serving as the outlet chamber.

In carrying out the invention, the inlet chamber 30A is defined within a front wall 34A, inner and outer sidewalls 35A and 36A, respectively, an upper wall 37A, and a backwall 38A. The inlet opening 15 is formed in the front wall such that the front wall defines the upstream end of the inlet chamber. The lower portion of the chamber is generally defined by a plane passing through the ring portion 27 and is generally open such that communication is established between the inlet chamber and the interior of the container 12. As a result, and due primarily to the lower open portion of the inlet chamber, the cross-sectional flow area abruptly and substantially increases upon going from the inlet opening into the upstream end of inlet chamber.

Figure 6:
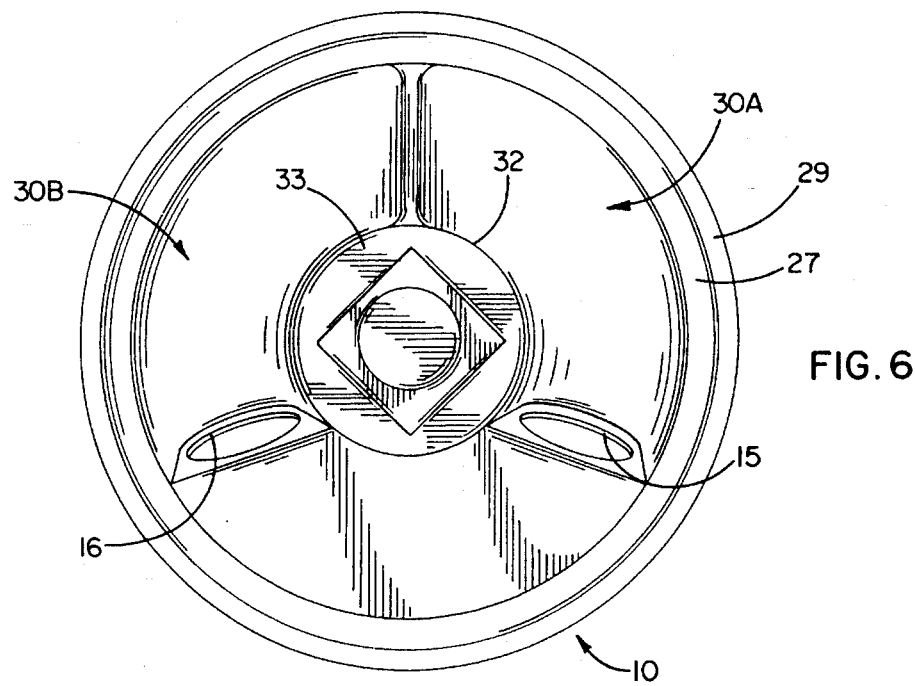

The front wall 34A is located forwardly of the center of the lid 10 (see FIG. 3) and faces generally forwardly and circumferentially on the lid. The base of the front wall is joined with the horizontal wall portion 34 and extends between the inner margin of the ring portion 27 and the cylindrical wall portion 32 at an offset angle relative to the center of the lid (see FIG. 6). Further, the front wall is inclined upwardly at a relatively small angle (e.g., 15 degrees) from vertical (see FIG. 7). Advantageously, this incline provides clearance relative to the horizontal wall portion to enable the pickup hose 22 to be slipped into inlet opening.

The backwall 38A defines the downstream end of the inlet chamber. The base of the backwall 38A is joined to the base of the backwall 38B of the outlet chamber 30B and extends radially relative to the center of the lid 10 between the inner margin of the ring portion 27 and the cylindrical wall portion 32. The backwall 38A is inclined upwardly and away from the backwall 38B of the outlet chamber 30B at a relatively sharp angle (e.g., 45 degrees) from horizontal.

The outer sidewall 36A extends vertically from the inner margin of the ring portion 27 and circumferentially between the outer margin of the front wall 34A and the outer margin of the backwall 38A so as to define the outer radial boundary of the inlet chamber 30A. The inner sidewall 35A extends vertically from the cylindrical wall portion 32 and circumferentially between the inner margin of the front wall and the inner margin of the backwall to define the inner radial boundary of the inlet chamber.

The upper wall 37A extends circumferentially and rearwardly from the upper portion of the front wall 34A to the upper portion of the backwall 38A. Further, the upper wall extends radially between the upper portions of the inner and outer sidewalls 35A, 36A so as to close the upper portion of the inlet chamber 30A. The forward section of the upper wall and the forward section of the sidewalls are preferably formed so as to define a semicircular shape at the upstream end of the inlet chamber. The upper wall then gradually flattens upon progressing toward the backwall. Moreover, the upper wall slopes downwardly upon progressing toward the backwall and is inclined at a relatively shallow angle, (e.g., 15 degrees) from horizontal, so as to cause the height of the inlet chamber to decrease upon progressing from the inlet opening 15. The junction between the relatively shallow angle of the upper wall and the relatively steep angle of the backwall is molded with a radiused profile to create a smooth transition between the upper wall and the backwall.

With the foregoing arrangement, the inlet chamber 30A is adapted to enable separation of a portion of the particles from the stream of air before the air leaves the inlet chamber. The incoming air enters the inlet chamber at a downwardly inclined but relatively shallow angle. This angle of entry is determined primarily by the angle of the exit end of the pickup hose 22 which, in turn, is established by the angle of the inlet opening 15 from vertical. Upon going from the exit end of the pickup hose into the upstream end of inlet chamber, the abrupt increase in flow area causes a relatively rapid expansion of the air stream. The corresponding reduction in the velocity of the air stream allows some of the larger particles to separate from the air stream as the particles enter the inlet chamber.

As the air flows through the inlet chamber 30A, the curved sidewalls 35A, 36A and the downwardly sloping upper wall 37A guide the air in a curved and downwardly inclined direction. As a result, additional particles impinge against the interior surfaces of the inlet chamber, particularly the interior surfaces of the outer sidewall and the upper wall, and separate from the air stream. Depending on the size and the weight of these particles, and depending on the velocity of the air in the inlet chamber, some of these particles will fall to the bottom of the container 12 while others will be driven along the interior surfaces of the inlet chamber. Upon reaching the downstream end of the inlet chamber, the backwall 38A then deflects these particles downwardly at a relatively sharp angle so as to enable the particles to fall to the bottom of the container. Upon exiting the inlet chamber 30A, the air continues in the curved and downwardly inclined direction so as to establish a cyclonic or swirling action in the container 12. As a result, additional particles separate from the swirling air and fall to the bottom of the container. As illustrated, the air swirls in a generally clockwise direction when viewed from above the container. Moreover, the backwall 38A deflects a portion of the air stream downwardly at a relatively sharp angle so as to prevent the air exiting the downstream end of the inlet chamber from being drawn directly into the outlet chamber.

Advantageously, the raised location of the inlet opening 15 relative to the container 12 and the orientation of the inlet opening relative to vertical prevents the incoming air from directly impinging onto the particles collecting in the container. As a result, the tendency of the incoming air to kick-up particles which have been collected in the container is substantially reduced.

In further carrying out the invention, the backwall 38B defines the upstream end of the outlet chamber 30B and the front wall 34B defines the downstream end of the outlet chamber. With this arrangement, as the blower 25 draws air through the outlet chamber, the sidewalls 35B, 36B and the upper wall 37B guide the outgoing air in a generally curved and upwardly inclined direction. As illustrated and when viewed from above the container 12, the air flows in a generally clockwise direction as the air proceeds through the outlet chamber and toward the outlet opening 16. As a result, the shape of the outlet chamber promotes the clockwise swirling of the air in the container so as to promote the separation of particles in the container. Moreover, the upwardly inclined angle of flow of the outgoing air and the relatively sharp angle defined between the backwalls 38A, 38B tend to reduce the likelihood of the outgoing air drawing particles from the chamber.

As the outgoing air approaches the outlet opening 16, the velocity of the outgoing air substantially increases. This increase in velocity is due to the reduction in cross-sectional flow area upon going from the downstream end of the outlet chamber 30B into the upstream end of the suction hose 24. Advantageously, the outlet opening is raised above the container 12 and is oriented at a relatively small angle (e.g., 15 degrees) from vertical so that the air entering the outlet opening and having the relatively high velocity is remote from the particles in the container. As a result, the likelihood of the outgoing air drawing particles from the container is further reduced.

From the foregoing, it will be apparent that the present invention brings to the art a new and improved lid 10 for a particle collector 11, the lid being provided with inlet and outlet chambers 30A, 30B adapted to guide the air stream into and out of the container 12 so as to establish and maintain a cyclonic action in the container for enhanced separation of particles in the container. By virtue of the raised location and orientation of the inlet and outlet openings 15 and 16, the incoming air is prevented from directly impinging on the particles collecting in the container and the outgoing air is less likely to draw out particles which have been collected in the container. Moreover, the inlet chamber enables separation of particles from the air stream before the air stream exits the inlet chamber while the backwall 38A directs these particles sharply downwardly toward the bottom of the container. Accordingly, the collector is capable of removing and collecting a greater volume of particles from the air stream.

We claim:

1. A molded plastic lid adapted to generally close off the open upper end of a container, the container and said lid coacting to remove and collect particles from a stream of air, said lid comprising a horizontal ring portion engaging the end portion of the container, and integrally molded inlet and outlet chambers generally located above said ring portion, said inlet chamber having an inlet opening for receiving the stream of air and having a lower open portion establishing communication with the container, said outlet chamber having a lower open portion establishing communication with the container and having an outlet opening for discharging the stream of air, said openings being formed in substantially vertical wall portions, said chambers having curved inner and outer sidewalls extending from said wall portions and having upper surfaces which slope downwardly upon progressing from said wall portions such that air flows through said inlet chamber in a generally curved and downwardly inclined direction and such that air flows through said outlet chamber in a generally curved and upwardly inclined direction.

2. A lid as defined in claim 1 in which said chambers generally approach one another upon progressing from said wall portions.

3. A lid as defined in claim 2 in which said inlet chamber is formed with a backwall located downstream of said wall portion, said backwall being inclined at a greater angle relative to horizontal than the angle of the upper surface of the inlet chamber.

4. A lid as defined in claim 1 in which said wall portions are inclined so as to be generally perpendicular to said upper surfaces.

5. A one-piece molded plastic lid for closing off the open upper end of a container, the lid being operable to separate particles entrained in a stream of air and to cause the particles to fall into the container, said lid comprising a generally circular top wall portion, an annular skirt depending from said top wall portion, said skirt being sized to telescope releasably with the upper end portion of the container, first wall means projecting upwardly from said top wall portion and defining an inlet chamber opening downwardly into said container, said first wall means having a generally circumferentially facing inlet opening for receiving the stream of air and entrained particles and being shaped to cause air entering said inlet opening to flow in a path which curves generally circumferentially and slopes downwardly as the air proceeds through said inlet chamber, said first wall means including means at the downstream end of said inlet chamber for deflecting the air and the entrained particles downwardly into said container, second wall means projecting upwardly from said top wall portion and defining an outlet chamber opening downwardly into said container, said second wall means having a generally circumferentially facing outlet opening spaced downstream from the downstream end of said inlet chamber and being shaped to cause the air to leave said container in a path which curves generally circumferentially and slopes upwardly as the air flow through said outlet chamber to said outlet opening.

* * * * *